United States Patent [19]

Tsugukuni et al.

[11] 3,875,091

[45] Apr. 1, 1975

[54] SYNTHETIC POLYMER DISPERSIONS AND PROCESS FOR PREPARATION THEREOF

[75] Inventors: Hideyoshi Tsugukuni, Osaka; Satoshi Tanaka, Nishinomiya; Mitsuhiro Matsuda, Osaka, all of Japan

[73] Assignee: Dai Nippon Toryo Co., Ltd., Osaka, Japan

[22] Filed: Dec. 26, 1972

[21] Appl. No.: 318,625

[30] Foreign Application Priority Data

June 25, 1971 Japan.............................. 46-046166
July 13, 1972 Japan.............................. 47-070287

[52] U.S. Cl...... 260/23 EM, 260/23 CP, 260/42.24, 260/42.26, 260/42.37, 260/875, 260/876, 260/879

[51] Int. Cl. ............................................. C08f 19/04

[58] Field of Search....... 260/23 EM, 876 R, 23 CP, 260/851, 875, 879, 886

[56] References Cited
UNITED STATES PATENTS

| 2,374,381 | 4/1945 | Root | 260/23 CP |
|---|---|---|---|
| 3,257,341 | 6/1966 | Osmond | 260/879 |
| 3,261,788 | 7/1966 | Carter | 260/851 |
| 3,264,234 | 8/1966 | Osmond | 260/886 |
| 3,514,500 | 5/1970 | Osmond | 260/875 |

FOREIGN PATENTS OR APPLICATIONS

| 941,305 | 11/1963 | United Kingdom |
|---|---|---|
| 1,052,241 | 12/1966 | United Kingdom |
| 1,101,984 | 2/1968 | United Kingdom |
| 23,350 | 0/1965 | Japan |
| 13,254 | 0/1967 | Japan |
| 16,147 | 0/1968 | Japan |

*Primary Examiner*—Donald E. Czaja
*Assistant Examiner*—William E. Parker

[57] ABSTRACT

This invention relates to a stable dispersion of a synthetic polymer in an oil medium for paints or sealants, which comprises (A) an oil medium capable of dissolving a monomer but incapable of dissolving a polymer formed from the monomer and (B) a polymer component obtained by block- or graft-copolymerization of a part of the oil medium (A) with a monomer copolymerizable with the oil medium (A), the weight ratio of component (A)/component (B) being from 25/75 to 95/5, and the invention also relates to a process for the preparation of such polymer dispersion.

10 Claims, No Drawings

SYNTHETIC POLYMER DISPERSIONS AND PROCESS FOR PREPARATION THEREOF

BACKGROUND OF THE INVENTION:

1. Field of the Invention:

This invention relates to a dispersion of a synthetic polymer dispersed stably in an oil medium, and to a process for the preparation of such polymer dispersion.

More particularly, the invention provides a coating or sealing composition having a high non-volatile content or comprising no solvent.

2. Description of the Prior Art:

Process for preparing dispersions of polymers in organic liquids (solvents) capable of dissolving monomers but incapable of polymers formed therefrom, and polymer dispersions obtained by such processes, have heretofore been known in the art.

As such known processes, the following can be mentioned:

1. A method comprising polymerizing a monomer dissolved in an organic liquid in the presence of a stabilizer composed of a block- or graft-copolymer formed by polymerizing a compound capable of being solvated with said organic liquid and a small proportion of a monomer capable of forming a polymer which is insoluble in the organic liquid, which method is disclosed in Japanese Pat. Publications, No. 7047/65 (U.S. Pat. No. 3,264,234), No. 21154/65 (U.S. Pat. No. 3,257,341), and No. 342/70 (U.S. Pat. No. 3,383,352).

In this method, the resulting polymer is insoluble in the organic liquid.

2. A method comprising polymerizing a monomer dissolved in an organic liquid in the presence of a stabilizer composed of a graft- or block-copolymer containing a group compatible with the resulting polymer and a group solvated with the organic liquid, which method is shown in Japanese Pat. Publication No. 23350/65 (British Pat. No. 1,052,241), No. 13524/67 (U.S. Pat. No. 3,261,788), and No. 16147/68 (U.S. Pat. No. 3,514,500).

3. A method comprising polymerizing a monomer in the presence of a graft-polymer stabilizer having a group soluble in an organic liquid and a group which is insoluble in the organic liquid and incompatible with the resulting polymer but capable of being swollen or dissolved in the monomer such as disclosed in Japanese Pat. Publication No. 14545/70 (British Pat. No. 1,101,984).

4. A method comprising polymerizing a monomer in the presence of a stabilizer formed by linking a polymer chain solvated with an organic liquid to a non-solvated chain by an ester, ether, amide or urethane linkage and to a vinyl type unsaturated group which is copolymerizable with the monomer, which method is shown in Japanese Pat. Publication No. 19186/65 (British Pat. No. 941,305).

These known methods, however, are defective or insufficient, because it is necessary to purify a polymer precursor used as the stabilizer or to adopt complicated polymerization steps. For instance, in the method (1), a small portion of a monomer is copolymerized with a group solvated with an organic liquid by employing an initiator for blockor graft-polymerization, to form a fine dispersion containing a block- or graft-copolymer. Subsequently, the initiator remaining in the dispersion is destroyed and the remaining monomer is polymerized in the dispersion with use of another initiator which is incapable or hardly capable of initiating the block- or graft-copolymerization. In this method, the polymerization comprises two steps, each employing a different initiator. Accordingly, this method is highly complicated and involves operational difficulties.

The stabilizer is usually used only for dispersing the polymer stably in the organic liquid medium, and thus, the amount of the stabilizer is reduced to the minimum. The stabilizer is generally contained in the polymer dispersion in an amount of from 1 to 10% by weight, at most 25% by weight, of the non-volatile components. In case the amount of the stabilizer is as low as mentioned above, it is possible to obtain a polymer dispersion having a low viscosity but the dispersion is extremely poor in room temperature film-forming property. For this reason, in order to obtain a film from this dispersion, it is necessary to subject it to the baking heat treatment or to plasticize the polymer of the dispersion internally by copolymerizing it with a monomer having a plasticizing activity, to thereby impart a room temperature film-forming property to the dispersion.

In most of these known polymer dispersions, the non-volatile contents in organic liquids are about 50% by weight, at most about 70% by weight. Further, in these known polymer dispersions the presence of an organic liquid is one of the essential requirements, and organic liquids are contained in very large amounts. Therefore, these dispersions involve problems of inflammability and smell.

Still further, in conventional polymer dispersions, incorporation of a stabilizer as well as an organic liquid is indispensable, and the stabilizer is usually block- or graft-copolymerized with a monomer.

SUMMARY OF THE INVENTION

This invention relates to a dispersion of a synthetic polymer dispersed stably in an oil medium, and to a process for the preparation of such polymer dispersion.

A primary object of this invention is to provide a composition of the non-solvent type or high non-volatile content type.

Another object of this invention is to provide a paint composition which can give a film excellent in weatherability, chemical resistance and drying properties.

A still further object of this invention is to provide a sealing composition which exhibits good handling characteristics without decrease of the volume or formation of cracks.

More specifically, this invention relates to (I) a dispersion of a polymer dispersed stably in an oil medium, which comprises (A) an oil medium capable of dissolving a monomer but incapable of a polymer formed by a polymerization of the monomer, and (B) a polymer component obtained by block- and graft-copolymerizing a part of said oil medium with a monomer, the weight ratio of component (A)/component (B) being from 25/75 to 95/5; (II) a polymer dispersion sealant comprising 100 parts by weight of said polymer dispersion (I) and 50 to 400 parts by weight of a filler; and (III) a process for the preparation of said polymer dispersion (I).

DESCRIPTION OF THE PREFERRED EMBODIMENTS

The oil mediums capable of dissolving a monomer but incapable of dissolving a polymer formed by polymerization of the monomer, which are used in this invention, include natural oils, and blow oils and thermally polymerized oils obtained by partially polymerizing oxidatively or thermally natural oils. More specifically, linseed oil, tung oil, Chinese tung oil, sardine oil, oiticica oil, perilla oil, dehydrated castor oil, tall oil, soybean oil, safflower oil, cotton seen oil, rice bran oil, coconut oil, olive oil, castor oil and other natural oils, and below oils and thermally polymerized oils obtained by partially polymerizing oxidatively or thermally soybean oil, cotton seed oil, castor oil and other natural oils, can be preferably used singly or in combination of two or more of them.

In view of the surface drying property of the resulting film or coating, it is preferred that the oil medium has an iodine value of at least 80. In case the polymer dispersion is used for formation of a sealing composition, in order to prevent formation of cracks by excessive advance of the internal curing, it is preferred that the iodine value is controlled at a level not exceeding 140.

The "iodine value" referred to in the specification and claims means a value of the amount of a halogen absorbed in a sample oil when the oil is reacted with the halogen, calculated as iodine and expressed in percent based on the sample oil. In general, the iodine value is calculated from the amount of iodine monochloride absorbed in an oil according to Wijs method or Hanus method or from the amount of iodine monochloride or iodine monobromide absorbed in an oil according to Hanus method.

In this invention, a stable dispersion of a low viscosity can be obtained by employing mixtures of oils differing in viscosity and prepared by oxidative or thermal polymerization of natural oils such as mentioned above.

More specifically, good results are obtained by employing a mixed medium comprising (a) a high viscosity oil medium having a viscosity of $Z_7$ or above as measured by Gardner-Holdt method at 20°C and (b) a low viscosity oil medium having a viscosity of C or below as measured by Gardner-Holdt method at 20°C, the (a)/(b) weight ratio being from 5/95 to 15/85.

In this invention it is also possible to employ a mixed medium formed by incorporating in such oil medium a small quantity of an organic liquid capable of dissolving a monomer but incapable of dissolving a polymer formed by polymerization of the monomer. As such organic liquid, there may be exemplified aliphatic and aromatic hydrocarbons having a relatively low dissolving power, such as rubber volatile, VM & P naphtha, mineral spirit, solvent kerosene, aromatic naphtha and solvent naphtha; aliphatic hydrocarbons such as n-butane, n-hexane, n-heptane, n-octane, isononane, n-decane and n-dodecane; and alicyclic hydrocarbons such as cyclopentane, cyclohexane and cycloheptane. In short, organic liquids having no polarity or a relatively low dissolving power are used. Such organic liquid is incorporated in the oil medium in an amount of up to 50%, preferably up to 30% by weight. In some cases, it it possible to incorporate a small amount of an organic liquid having a polarity or a high dissolving power into such organic liquid.

In this invention, at least one copolymerizable monomer is copolymerized in the above-mentioned oil medium. The term "copolymerizable" used in the specification and claims means a monomer having at least one chemical structure $>C=C<$ in the molecule and having an ability to form a block- or graft-copolymer by reaction with an oil medium (A). As such monomer, the following can be exemplified:

a. nitrile type monomers such as acrylonitrile, methacrylonitrile and fumaronitrile;

b. allyl type monomers such as allyl acetate, diallyl acetate, diallyl adipate, allyl chloride, allyl alcohol, 2-chloroallyl acetate, 2-cloroallyl chloride, methallyl acetate and methallyl chloride;

c. ethylene type monomers such as cis-dichloroethylene, trans-dichloroethylene, tetrachloroethylene and trichloroethylene;

d. unsaturated dibasic acids such as maleic anhydride, diethyl maleate and fumaric acid;

e. unsaturated carboxylic acids such as acrylic acid, methacrylic acid and itaconic acid;

f. acrylic acid esters such as methyl acrylate, ethyl acrylate, n-propyl acrylate, iso-propyl acrylate, n-butyl acrylate, iso-butyl acrylate, tert-butyl acrylate, 2-ethyl-hexyl acrylate, lauryl acrylate, dodecyl acrylate, stearyl acrylate, cyclohexyl acrylate, dimethylaminoethyl acrylate, diethylaminoethyl acrylate and glycidyl acrylate;

g. methacrylic acid esters such as methyl methacrylate, ethyl methacrylate, n-propyl methacrylate, iso-propyl methacrylate, n-butyl methacrylate, iso-butyl methacrylate, tert-butyl methacrylate, 2-ethylhexyl methacrylate, lauryl methacrylate, dodecyl methacrylate, stearyl methacrylate, cyclohexyl methacrylate, dimethylaminoethyl methacrylate, diethylaminoethyl methacrylate and glycidyl methacrylate;

h. styrene type monomers such as styrene, vinyl toluene and α-methyl styrene;

i. other monomers such as vinyl acetate, vinyl formate, vinyl propionate, vinyl stearate, divinyl benzene, di-isopropenyl benzene, dimethyl itaconate, vinyl chloride and vinylidene chloride; and j. hydroxyl group-containing unsaturated monomers such as 2-hydroxyethyl acrylate, 2-hydroxypropyl acrylate, 2-hydroxyethyl methacrylate, 2-hydroxypropyl methacrylate and N-methylol acrylamide.

These monomers may be used singly or in the form of admixtures of two or more of them.

When commercially available products of these copolymerizable monomers is used, it is not always necessary to remove therefrom polymerization initiators found in commercial products, such as hydroquinone.

In case a combination of two or more of the above copolymerizable monomers is employed, it is preferred that an alkyl ester of acrylic or methacrylic acid having 1 to 3 carbon atoms in the alkyl portion, a vinyl ester monomer having 4 to 7 carbon atoms, or a styrene type monomer is used in an amount greater than 20% by weight of the total monomers.

A radical initiator may be used for the preparation of polymer dispersions. As the radical initiator there may be mentioned, for instance, organic peroxide initiators such as benzoyl peroxide, lauroyl peroxide, cumene hydroperoxide, di-tert-butyl peroxide and acetyl peroxide, and nitrile type initiators such as α,α'-azobisisobutyronitrile. The amount of the initiator is 0.01 to 3% by weight, preferably 0.5 to 1% by weight, based on the total monomers.

In carrying out the process of this invention, the reaction temperature is 0° – 150°C, preferably 50° – 100°C, and the polymerization time is 1 – 24 hours, preferably 2 – 5 hours. The addition of copolymerizable monomers may be accomplished dividedly in two or more times. It is preferable to introduce nitrogen in a reactor during the polymerization, but introduction of nitrogen is not always necessary. In some special cases, for instance, in case gaseous monomers are used, the reaction may be carried out under pressure.

In the polymer dispersions obtained according to this invention, the average size of the dispersed particles is within a range of from 0.1 to 10μ.

In this invention, the majority of the monomer is block- or graft-copolymerized with the oil medium. In addition, copolymerization of monomers is caused to occur to some extent when a plurality of monomers are used. Accordingly, the polymer dispersion of this invention consists essentially of a block- or graft-copolymer of the oil medium and the monomer, and in some cases, it includes a very small amount of a polymer of the monomer or monomers. In this invention, for sake of convenience, the term "polymer component insoluble in the oil medium" is used to mean inclusively such oil-monomer copolymer and polymer of the monomer or monomers.

As regards the composition of the polymer dispersion of this invention, it is preferred that the weight ratio of oil medium (A)/polymer component (B) insoluble in the oil medium is within the range of from 25/75 to 95/5. In case the amount of the oil medium is less than 25% by weight, properties inherent of the oil, such as adherence, pigment dispersibility and penetration in a substrate, are drastically degraded. When the amount of the oil medium exceeds 95% by weight, the drying property of the resulting coating or film is bad with degradation of weatherability and extreme yellow coloration is observed during storage. For these reasons, the amount of the oil medium is limited within the above range.

In the polymer dispersion of this invention, the polymer component is dispersed stably in the oil medium without incorporation of a particular stabilizer. Further, the polymer dispersion of this invention does not contain a volatile component or hardly contains a volatile component. Therefore, it can be formed into a composition of the non-solvent type or high non-volatile content type.

When the polymer dispersion of this invention is used as a coating composition, the polymer dispersion is incorporated with an organic or inorganic pigment, a dye and other necessary additives and the resulting composition is coated on a substrate such as a plate of a metal, e.g., iron, steel, aluminum, zinc and zinc-plated plate, a plywood, a wooden board, paper, cloth, fabrics and plastics. A thick film can be obtained by conducting the coating only once, and a film excellent in quick drying property, weatherability and chemical resistance can be formed from the above composition including the polymer dispersion of this invention. As the additives, there may be employed known driers such as cobalt, manganese, lead, zinc, copper, calcium and iron salts of naphthenic acid, linoleic acid and octenic acid. Still further, known sufactants and dispersing agents can be used.

During the stage of film formation, the oil component of the polymer dispersion of this invention exhibits a plasticizing activity for sticking the polymer component to the substrate, and then it is cured by the oxidative polymerization, whereby a tough film having a good flexibility can be obtained.

The polymer dispersion of this invention can be used also as a sealing composition. More specifically, when the dispersion is used as a caulking, sealing or roofing composition, 100 parts by weight of the polymer dispersion is mixed with 50 to 400 parts of a filler such as calcium carbonate, silica, silica powder, barium sulfate, alumina, clay, kaoline, talc, gypsum, ceramic powder, diatomaceous earth, other body pigments, asbestos and fibrous powder. According to need, coloring pigments such as zinc flower, white lead, lithopone, titanium white, basic lead sulfate, antimony oxide and carbon black can be used. Further, such additives as dispersing agents and driers may be incorporated into the composition, according to need. The resulting sealing composition is coated on concrete, mortar, foamed concrete and the like, or it is used as a sealant.

The sealing composition including the polymer dispersion of this invention has the following advantages over conventional oily and aqueous sealing compositions:

1. Since it contains no volatile component, decrease of the volume is not caused to occur.
2. Even at a low viscosity, no sagging is observed and increase of the viscosity at low temperature is scare; therefore, good handling properties are obtained.
3. Since it exhibits a good adhesion, use of a primer is unnecessary.
4. After coating and sealing, the surface becomes dry but the interior retains softness; therefore, cracks are not formed even when used for a long time.

As regards the properties of the sealing composition 8 this invention, it was confirmed that it is superior or comparable to asphalt or urethane type roofing compositions with respect to formation of cracks by aging or softness.

This invention will now be described in more detail by referring to Examples and Comparative Examples, where all "parts" and "percentages" are on the weight basis, unless otherwise indicated.

EXAMPLE 1

A reaction vessel equipped with an agitator, a thermometer, a cooling tube, a dropping funnel and a heating member was charged with 200 parts of linseed oil, and the temperature was raised to 120°C. While blowing air into the reaction vessel, agitation was carried out at 140°C for 13 hours to obtain a polymerized oil having a viscosity of S are measured by Gardner-Holdt method at 25°C and having an iodine value of 120. Then, nitrogen was introduced into the reaction vessel and the temperature was lowered to 80°C. A mixture of 70 parts of methyl methacrylate, 20 parts of styrene, 10 parts of acrylonitrile and 0.5 part of benzoyl peroxide, which had been prepared in advance, was added dropwise into the charge of the reaction vessel over a period of 2 hours, and the reaction was carried out at 83°C for 10 hours under agitation to obtain a milky white polymer dispersion (I) having a non-volatile content of 99.4% and a viscosity of U as measured at 25°C by Gardner-Holdt method (bubble viscometer).

EXAMPLE 2

In the same reaction vessel as employed in Example 1, procedures of Example 1 were repeated by employing polymerized soybean oil having a viscosity of S as measured by Gardner-Holdt method at 25°C and an iodine value of 100 instead of the linseed oil, to obtain a milky white polymer dispersion (II) having a non-volatile content of 99.6% and a viscosity of S are measured by Gardner-Holdt method at 25°C.

The milky white polymer dispersions (50 parts) obtained in Examples 1 and 2 were each incorporated with 20 parts of titanium oxide and 20 parts of a body pigment. The mixtures were kneaded by means of a roll and a drier was incorporated therein. The resulting paints were used to coat a metal plate and dried to obtain films having good weatherability and chemical resistance.

EXAMPLE 3

The same reaction vessel as used in Example 1 was charged with 100 parts of a blow oil (having a viscosity of R as measured by Gardner-Holdt method at 25°C) prepared from sufflower oil and 20 parts of mineral turpentine, and the temperature of the mixture was elevated to 80°C. A mixture of 56 parts of methyl methacrylate, 16 parts of styrene, 8 parts of acrylonitrile and 0.4 part of benzoyl peroxide, which had been prepared in advance, was added dropwise to the charge of the reaction vessel over a period of 3 hours, and the reaction was carried out at 83°C for 8 hours under agitation to obtain a milky white polymer dispersion having a non-volatile content of 89.5% and a viscosity of 0 as measured by Gardner-Holdt method at 25°C.

EXAMPLE 4

The same reaction vessel as used in Example 1 was charged with 200 parts of polymerized soybean oil having a viscosity of R as measured at 25°C by Gardner-Holdt method. The temperature was raised to 80°C and a mixture of 60 parts of methyl methacrylate, 20 parts of styrene and 20 parts of ethyl acrylate, which had been prepared in advance, was added dropwise to the charge of the reaction vessel over a period of 2 hours, following which the reaction was carried out at 83°C for 8 hours under agitation, to obtain a milky white polymer dispersion having a non-volatile content of 99.3% and a viscosity Z as measured at 25°C by Gardner-Holdt method.

EXAMPLE 5

Procedures of Example 4 were repeated by employing lineseed oil instead of the soybean oil, to obtain a milky white polymer dispersion having a non-volatile content of 99.4% and a viscosity of Y as measured at 25°C by Gardner-Holdt method.

When polymer dispersions obtained in Examples 3, 4 and 5 were coated on a metal plate, each dispersion exhibited a quick drying property and gave a film of good quality.

EXAMPLE 6

A mixture of 57 parts of the polymer dispersion (I), 3.5 parts of titanium oxide, 0.03 part of carbon black, 40 parts of calcium carbonate and 2 parts of a dispersing agent and a drier was kneaded by means of a roll to obtain a sealing composition. When this composition was used as a caulking material, it exhibited good spatual workability and gave a product free of volume decrease and cracks.

EXAMPLE 7

A mixture of 57 parts of the polymer dispersion (II), 3.5 parts of titanium oxide, 0.03 part of carbon black, 30 parts of talc, 10 parts of asbestos and 2 parts of a dispersing agent and a drier was kneaded by means of a roll. The resulting caulking material exhibited as good workability and properties as those of the composition obtained in Example 6.

EXAMPLE 8

1. Preparation of Polymer Dispersion:

The same reaction vessel as used in Example 1 was charged with 200 parts of linseed oil, and the temperature was raised to 285°C while introducing nitrogen in the reaction vessel. The reaction was conducted at 285°C for about 6 hours to obtain a polymerized oil having a viscosity of Y as measured at 25°C by Gardner-Holdt method and an iodine value of 130. Then, the temperature was lowered to 80°C and a mixture of 60 parts of methyl methacrylate, 20 parts of styrene, 20 parts of ethyl acrylate and 0.5 part of benzoyl peroxide was added dropwise to the polymerized oil over a period of 10 hours, and the reaction was carried out at 83°C for 10 hours to obtain a milky white polymer dispersion (III) having a non-volatile content of 99.5% and a viscosity of Z as measured at 25°C by Gardner-Holdt method.

2. Preparation of Sealing Composition:

A mixture of 45 parts of the polymer dispersion (III), 3.5 parts of titanium oxide, 0.03 part of carbon black, 42 parts of calcium carbonate, 8 parts of asbestos and 2 parts of other additives such as a dispersing agent and a drier was kneaded by means of a roll to obtain a roofing material excellent in workability and properties.

EXAMPLE 9

A reaction vessel equipped with an agitator, a thermometer, a cooling tube, a dropping funnel and a heating member was charged with starting soybean oil, and the temperature was raised to 120°C. While blowing air into the reaction vessel, agitation was carried out at 140° – 150°C for 28 hours to obtain a high viscosity polymerized oil (a) having a viscosity of $Z_8$ as measured at 20°C by means of a Gardner-Holdt method. In the same manner, starting soybean oil was agitated at 140° – 150°C for 2 hours to obtain a low viscosity oil (b) having a viscosity of B as measured at 20°C by means of a Gardner-Holdt method. A similar reaction vessel was charged with 20 parts of the high viscosity oil (a) and 180 parts of the low viscosity oil (b) to obtain a mixed oil medium having a viscosity of F as measured at 20°C by means of a Gardner bubble viscometer. This mixed oil medium was heated, and while maintaining the temperature at 83° – 85°C, a mixture of 70 parts of methyl methacrylate, 20 parts of styrene, 10 parts of acrylonitrile and 0.5 parts of benzoyl peroxide, which had been prepared and placed in the dropping funnel in advance, was added dropwise to the mixed oil medium over a period of 2 hours, and the reaction was carried out under agitation in a nitrogen gas current for 10 hours, while $\alpha,\alpha'$azobisisobutyronitrile was added in an amount of 0.3 part at the point of four hours from the initiation of the reaction, in an amount of 0.7 part at the point of 6 hours and in an amount of 1.0 part at the point of 8 hours. Thus was obtained a milky white, very homogeneous polymer dispersion (IV) having a solid content of about 100% and a viscosity of O – P as measured at 20°C by means of a Gardner-Holdt method.

EXAMPLE 10

In the same reaction vessel as used in Example 1, 20 parts of high viscosity soybean oil (a) having a viscosity of $Z_8$ as measured at 20°C by means of a Gardner-Holdt method was mixed with low viscosity linseed oil (b') having a viscosity of B as measured at 20°C by means of a Gardner-Holdt method, which had been prepared by agitating starting linseed oil at 140° – 150°C for 2 hours while blowing air, and while the temperature of the mixed oil medium was maintained at 83° – 85°C, a mixture of 140 parts of methyl methacrylate, 40 parts of styrene, 20 parts of acrylonitrile and 1 part of benzoyl peroxide, which had been prepared and placed in the dropping funnel in advance, was added dropwise to the mixed oil medium over a period of 3 hours. The mixture was agitated at 83° – 85°C and at the point of one hour from the initiation of the agitation 0.6 part of $\alpha,\alpha'$-azobisisobutyronitrile was added. Further, $\alpha,\alpha'$-azobisisobutyronitrile was added in an amount of 1.4 parts at the point of 3 hours from the initiation of the agitation and in an amount of 2 parts at the point of 5 hours from the initiation of the agitation. In this manner, the reaction was carried out under agitation for 7 hours as a whole to obtain a milky white dispersion (V) having a solid content of about 100% and a viscosity of U – V as measured at 20°C by means of a Gardner-Holdt method.

Each of the milky white synthetic polymer dispersions (IV) and (V) (50 parts) obtained in Examples 9 and 10 was incorporated with 20 parts of titanium oxide and 20 parts of a body pigment, and the resulting mixtures were kneaded by means of a roll. A drier was added to each of the kneaded mixtures. Films obtained by coating these compositions on a metal plate and air-drying them naturally exhibited good weatherability and chemical resistance.

Further, sealing compositions obtained by mixing each of the polymer dispersions (IV) and (V) obtained in Examples 9 and 10 with 45 parts of titanium oxide, 0.03 part of carbon black, 42 parts of calcium carbonate, 8 parts of asbestos and 2 parts of other additives such as a dispersing agent and a drier and kneading the mixture were excellent in spatula workability and exhibited good properties.

COMPARATIVE EXAMPLE 1

A mixture of 70 parts of methyl methacrylate, 20 parts of styrene, 10 parts of acrylonitrile and 0.5 part of benzoyl peroxide was added dropwise to a mixed oil medium having a viscosity of S as measured at 25°C by Gardner-Holdt method, which has been prepared by mixing 100 parts of polymerized soybean oil having a viscosity of Z are measured at 25°C by Gardner-Holdt method and an iodine value of 100 with 100 parts of coconut oil having an iodine value of 8, and the reaction was carried out in the same manner as in Example 1 to obtain a milky white polymer dispersion having a non-valatile content of 99.7% and a viscosity V as measured at 25°C by Gardner-Holdt method. A mixture of 57 parts of the so formed polymer dispersion, 3.5 parts of titanium oxide, 0.03 part of carbon black, 30 parts of talc, 10 parts of asbestos and 2 parts of a dispersing agent and a drier was kneaded by means of a roll to obtain a caulking material.

COMPARATIVE EXAMPLE 2

A mixture of 57 parts of the above-mentioned polymer dispersion (I), 3.5 parts of titanium oxide, 0.03 part of carbon black, 256 parts of calcium carbonate and 2 parts of a dispersing agent and a drier was kneaded by means of a roll to obtain a caulking material.

Properties of sealing compositions obtained in Examples 6 to 8 and Comparative Examples 1 and 2 were evaluated to obtain results shown in Table 1.

Table 1

| | Example 6 | Example 7 | Example 8 | Comparative Example 1 | Comparative Example 2 | Commercial Oily Caulking Material | Commercial Aqueous Caulking Material |
|---|---|---|---|---|---|---|---|
| Handling Characteristics | | | | | | | |
| workability | ◉ | ◉ | ◉ | ◉ | X | X | ◉ |
| sagging | ◉ | ◉ | ◉ | ◉ | ◉ | △ | △ |
| Characteristics at Application | | | | | | | |
| peeling | ◉ | ◉ | ◉ | ◉ | △ | △ | △ |
| crack | ◉ | ◉ | ◉ | ◉ | X | O-△ | ◉ |
| surface stickiness | ◉ | ◉ | ◉ | X | ◉ | O-△ | ◉ |
| bleeding | ◉ | ◉ | ◉ | △ | ◉ | X | ◉ |
| volume decrease | ◉ | ◉ | ◉ | ◉ | ◉ | O-△ | X |

Symbols in the Table have the following meaning:

◉ : very good

O : ordinary

△ : slightly bad

X : very bad

Notes:
  Workability: spatula workability such as easiness in cutting or turning at spatula operation.
  Sagging: degree of sagging observed when the sample caulking material was packed in a groove of a width of 1 cm, a depth of 1 cm and a length of 10 cm and the groove was placed vertically.
  Peeling: state after 3 months' exposure (joint fillering of a 1 cm width in cement blocks).
  Crack: surface condition after 3 months' exposure.
  Surface stickiness: surface stickiness after 1 week.
  Bleeding: bleeding in the cement block boundary and bleeding observed when top coating was effected.
  Volume decrease: surface caving and volume decrease after 1 month's exposure.
  Oily caulking material: Fine caulk manufactured by Nihon Tenkazai Co., Ltd.
  Aqueous caulking material: Boscoseal 410 manufactured by Bostik Japan Co., Ltd.

What we claim is:

1. A dispersion of a synthetic polymer dispersed stably in an oil medium, which comprises (A) an oil medium being selected from the group consisting of natural oils, blow oils, and partially and thermally polymerized natural oils, said oil medium having an iodine value of at least 80, said oil medium being capable of dissolving an $\alpha,\beta$,-ethylenically unsatuated monomer but incapable of dissolving a polymer formed by polymerization of the monomer, and (B) a polymer mixture component obtained by block or graft-copolymerizing a part of the oil medium (A) with said $\alpha,\beta$,-ethylenically unsaturated monomer copolymerizable with the oil medium (A) and including a very small amount of a polymer of said monomer the weight ratio of component (A) / component (B) being from 25/75 to 95/5, with said dispersion containing disperse particles of an average size within a range from 0.1 to 10 microns.

2. A synthetic polymer dispersion as set forth in claim 1, wherein the oil medium (A) includes up to 50% by weight of an organic liquid capable of dissolving a monomer but incapable of dissolving a polymer formed by polymerization of the monomer.

3. A synthetic polymer dispersion as set forth in claim 1, wherein the oil medium (A) is at least one member selected from natural oils such as linseed oil, tung oil, Chinese tung oil, sardine oil, oiticica oil, perilla oil, dehydrated castor oil, tall oil, soybean oil, safflower oil, cotton seed oil, rice bran oil, olive oil and castor oil, and polymerized oils derived from these natural oils.

4. A synthetic polymer dispersion as set forth in claim 1, wherein the oil medium (A) is a mixture of (a) a high viscosity oil medium having a viscosity of $Z_7$ or above as measured at 20°C by Gardner-Holdt method and (b) a low viscosity oil medium having a viscosity of C or below as measured at 20°C by Gardner-Holdt method, the weight ratio of oil medium (a)/oil medium (b) being from 5/95 to 15/85.

5. A process for the preparation of a dispersion of a synthetic polymer dispersed stably in an oil medium or a mixed medium of an oil and an organic liquid, which comprises blockor graft-copolymerizing at temperatures of 0° C to 150° C in an oil medium capable of dissolving a monomer but incapable of dissolving a polymer formed by polymerization of the monomer, a monomer copolymerizable with said medium to thereby form a polymer component insoluble in said medium in which the weight ratio of medium/insoluble polymer component is from 25/75 to 95/5.

6. A sealing composition comprising (I) 100 parts by weight of a dispersion of a synthetic polymer dispersed stably in an oil medium, which comprises (A) an oil medium capable of dissolving a monomer but incapable of dissolving a polymer formed by polymerization of the monomer, and (B) a polymer component obtained by block- or graft-copolymerizing a part of the oil medium (A) with a monomer copolymerizable with said oil medium (A), the weight ratio of oil medium (A)/polymer component (B) being from 25/75 to 95/5, and (II) 50 to 400 parts of a filler.

7. A sealing composition as set forth in claim 6, wherein the oil medium is at least one member selected from natural oils having an iodine value of 80 to 140, and blow oils and thermally polymerized oils formed by partially polymerizing such natural oils oxidatively or thermally.

8. A sealing composition as set forth in claim 6, wherein the oil medium is at least one member selected from natural oils having an iodine value of 80 to 140, such as linseed oil, tung oil, Chinese tung oil, sardine oil, oiticica oil, perilla oil, dehydrated castor oil, tall oil, soybean oil, safflower oil, cotton seed oil, rice bran oil, coconut oil, olive oil and castor oil, and blow oils and thermally polymerized oils formed by partially polymerizing such natural oils oxidatively or thermally.

9. A sealing composition as set forth in claim 6, wherein the oil medium is a mixed medium of (a) a high viscosity oil medium having a viscosity of $Z_7$ or above as measured at 20°C by Gardner-Holdt method and (b) a low viscosity oil medium having a viscosity of C or below as measured at 20°C by Gardner-Holdt method, the weight ratio of oil medium (a)/oil medium (b) being from 5/95 to 15/85.

10. A sealing composition as set forth in claim 6, wherein the filler is a member selected from calcium carbonate, silica, silica powder, barium sulfate, alumina, clay, keoline, talc, gypsum, ceramic powder, diatomaceous earth, asbestos and fibrous powder.

* * * * *